No. 888,281. PATENTED MAY 19, 1908.
W. H. WEASER.
EYEGLASSES.
APPLICATION FILED SEPT. 20, 1906.
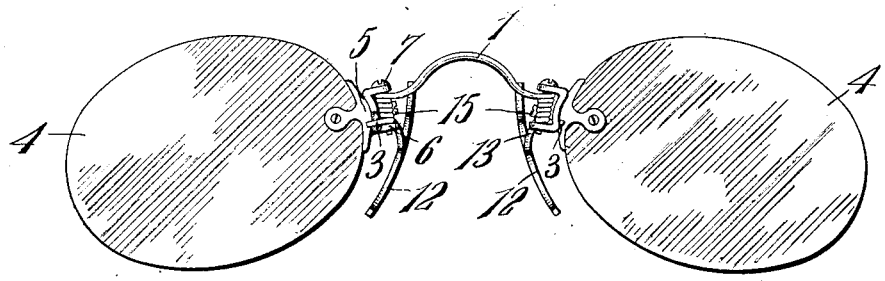
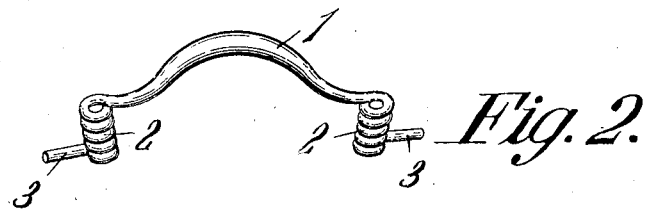
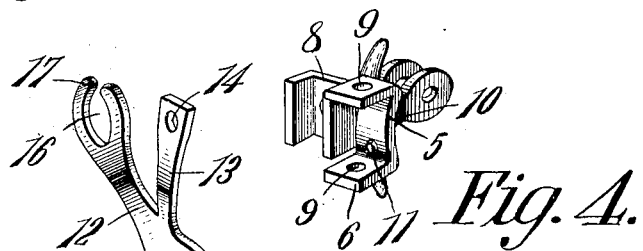
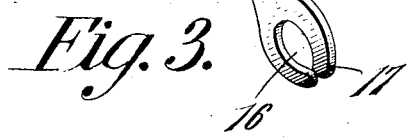
WITNESSES: William H. Weaser, INVENTOR.
By C. A. Snow & Co
ATTORNEYS

UNITED STATES PATENT OFFICE.

WILLIAM HENRY WEASER. OF PITTSFIELD, MASSACHUSETTS.

EYEGLASSES

No. 888,281.    Specification of Letters Patent.    Patented May 19, 1908.

Application filed September 20, 1906. Serial No. 335,422.

*To all whom it may concern:*

Be it known that I, WILLIAM HENRY WEASER, a citizen of the United States, residing at Pittsfield, in the county of Berkshire and State of Massachusetts, have invented new and useful Eyeglasses, of which the following is a specification.

This invention relates to improvements in eyeglasses, and it has for one of its objects to provide a bridge having means at its extremities whereby the lenses are flexibly connected thereto, so that by bowing the glasses as a whole in a forward direction, the guards can be spread apart so as to be adjusted to the nose of the wearer.

A further object of the invention is the provision of a simple and inexpensive form of post for attachment of the bridge and lens for affording flexibility between the parts. And a further object of the invention resides in the employment of an improved form of guard whereby the gripping effect is materially increased.

With these objects in view, and others, as will appear as the nature of the invention is better understood, the invention comprises the various novel features of construction and arrangement of parts, which will be more fully described hereinafter and set forth with particularity in the claims appended hereto.

In the accompanying drawing, which illustrates one of the embodiments of the invention, Figure 1 is a front elevation of the eyeglass. Fig. 2 is a perspective view of the single-piece nose bridge of the glasses shown on an enlarged scale. Fig. 3 is a perspective view of one of the nose guards. Fig. 4 is a perspective view of one of the posts to which one end of the bridge and one each of the nose guards and lenses are attached.

Corresponding parts in the several figures are indicated throughout by similar characters of reference.

Referring to the drawing, 1 designates a bridge of the lens supporting frame, the same being of metal of any suitable cross section and material and preferably arched or bowed at its center. The blank from which the bridge is made is preferably of circular cross section at its ends and is of sufficient length to permit the portions adjacent the ends to be formed into helical coils 2 arranged with their axes approximately parallel and disposed at right angles to the general length of the bridge proper. The extremities of the coils 2 are each brought out in opposite directions, as indicated at 3, for the purpose hereinafter to appear.

The lenses 4 are connected with the posts 5 in the usual manner, said posts being of ordinary construction, except that they are each provided with apertured lugs 6 for receiving the screws or pins 7 by which the posts are attached to the bridge. The lugs 6 of each post are disposed at the front side of the box 8 to which the nose guard is attached, according to the usual construction. The lugs 6, which are integrally or otherwise suitably connected with the post 5, are spaced apart and extend horizontally. The spring coils 2 of the bridge are disposed between the lugs 6 and are retained in position by the screws 7 which extend through the apertures 9 and the hollow of the coils 2. The flange 10 on each post 5, to which the lugs 6 are connected, is provided with an aperture 11 for receiving the projecting ends 3 of the adjacent coil 2, so that the lenses are firmly held in their proper position with respect to the bridge. By means of this construction, the lenses are each flexibly connected with the bridge and are capable of a limited pivotal movement or swing in a forward direction about the screw 7 as an axis. As shown in Fig. 1, the coils 2 are so constructed that the forward movement of the lenses tends to wind or tighten the coils. This arrangement, however, is not obligatory, since the coils can be wound in the opposite direction, so that they will tend to unwind by the forward movement of the lenses.

The nose guards 12 are provided with supporting arms 13, each arm being apertured at 14 for receiving the screw 15 whereby the guard is attached to its respective box 8. The guards are thus rigidly attached to the supporting posts 5 so that they can be spread apart by bowing or flexing the lenses forward against the tension of the coils 2, so that the guards can be readily adjusted to the nose of the wearer. These guards may be of any approved construction, but, by preference, they are each provided with opened eyes 16, so as to better grip the flesh of the nose. I am aware that guards have been constructed heretofore with apertures, for the purpose of increasing the clamping or gripping effect of the guards, but I have found that by cutting away the ends of the guards, so as to form the extremities into bifurcations 17, a better hold on the flesh of the nose can be produced, so that the glasses are not so readily displaced or worked loose. The extremities of adjacent bifurcations 17 are preferably rounded and but slightly separated, and the edges of the guards that grip into the flesh are carefully finished so that the glasses will be comfortable to wear. The holding power may be further increased by providing suitably arranged ridges or grooves in the nose guards on the surfaces that bear on the nose, as will be readily understood.

I have described the principle of operation of the invention, together with the apparatus which I now consider to be the best embodiment thereof, but I desire to have it understood that the apparatus shown is merely illustrative, and that various changes may be made, when desired, as are within the scope of the invention.

What is claimed is:—

1. An eyeglass comprising lenses, a bridge having coil springs formed at its ends and having laterally projecting extremities, a post for each lens having an opening for receiving one of the extremities of the springs, members on the posts which extend through the coils of the bridge, and nose guards attached to the posts.

2. An eyeglass comprising lenses, a bridge having its ends formed into helical springs of the torsion type, posts having apertured lugs, and screws extending through the springs and apertured lugs for pivotally connecting the lenses with the springs of the bridge.

3. An eyeglass comprising lenses, a bridge having coiled end portions disposed with their axes at approximately right angles to the length of the bridge, posts having apertured lugs, screws extending through the apertures of the lugs for securing the coiled ends of the bridge to the post, boxes on the posts, and nose guards secured in the boxes.

In testimony that I claim the foregoing as my own, I have hereto affixed my signature in the presence of two witnesses.

WILL. HENRY WEASER.

Witnesses:
STEWART KERR,
ALFONSO ERNEST DE GEORGE.